United States Patent
Lee et al.

(10) Patent No.: US 8,186,059 B2
(45) Date of Patent: May 29, 2012

(54) METHOD OF MANUFACTURING AN INTERNAL GEAR AND CAP ASSEMBLY

(75) Inventors: Jeffrey R. Lee, Tipton, MI (US); Stephen D. Doubler, Saline, MI (US); Travis M. Thompson, Ann Arbor, MI (US); Steven L. Clark, Canton, MI (US); Richard Vriesen, Lasalle, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 912 days.

(21) Appl. No.: 12/206,896

(22) Filed: Sep. 9, 2008

(65) Prior Publication Data

US 2010/0062894 A1    Mar. 11, 2010

(51) Int. Cl.
*B21D 39/00* (2006.01)
*B23P 11/00* (2006.01)

(52) U.S. Cl. ............ 29/893.2; 29/505; 29/509; 403/282

(58) Field of Classification Search ............ 29/893, 29/893.1, 893.2, 893.3, 893.35, 505, 509; 403/282

See application file for complete search history.

(56) References Cited

U.S. PATENT DOCUMENTS

| 1,562,419 | A  | * | 11/1925  | Bowen ............... 219/150 R |
| 5,887,330 | A  | * | 3/1999   | Cole et al. ............... 29/509 |
| 7,464,452 | B2 | * | 12/2008  | Yamamoto et al. ......... 29/505 |

FOREIGN PATENT DOCUMENTS

| DE | 19532519 A1 | 3/1997 |
| DE | 69424245 T2 | 1/2001 |
| DE | 10115783 A1 | 10/2001 |
| DE | 10310371 B3 | 8/2004 |
| DE | 102007042835 A | 3/2009 |

* cited by examiner

*Primary Examiner* — Jermie Cozart
(74) *Attorney, Agent, or Firm* — Quinn Law Group, PLLC

(57) ABSTRACT

An internal gear and cap assembly includes a gear having a base that extends about an axis between a first and second end. The first end defines a groove that extends to a floor and the groove surrounds the axis. Teeth extend from the base. A lip extends from the first end and also surrounds the axis. A cap has a flange that is inserted into the groove. The lip is deformed toward the groove such that material from the lip flows to trap the flange between the lip and the floor of the groove to retain the cap to the gear in the axial direction. Slots may be defined in the flange such that the material from the lip flows into the slots to provide a key-lock between the cap and the gear to prevent rotation of the cap relative to the gear about the axis.

5 Claims, 4 Drawing Sheets

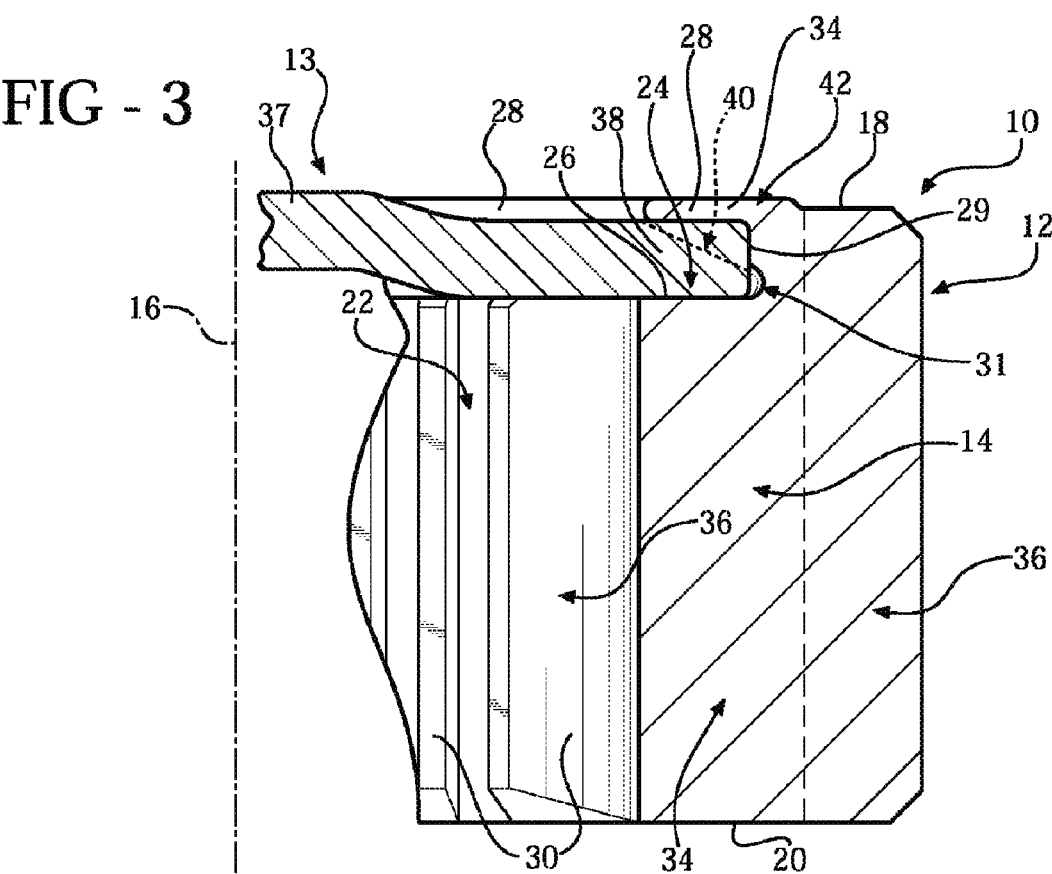

METHOD OF MANUFACTURING AN INTERNAL GEAR AND CAP ASSEMBLY

TECHNICAL FIELD

The present invention relates to an internal gear and cap assembly and a method of manufacturing the assembly.

BACKGROUND OF THE INVENTION

Internal gears for a planetary transmission may require that each of the internal gears be connected to a cap, or similar part, which closes off one end of the internal gear. The cap enables axial thrust forces of the gear to be counteracted and defines a thru-hole and other rotating components within the transmission pass through the thru-hole. The internal gear includes a body that surrounds an axis of rotation and the body extends between opposing ends. Splines and/or gears are spaced circumferentially on the body and extend about the axis. One of the ends defines a groove that extends to a floor and the groove surrounds the axis. A lip extends upward from the floor of the groove and surrounds the groove in spaced relationship to the axis. The lip defines a channel that extends perpendicular to the axis and surrounds the groove. The cap includes a flange that extends about the periphery. The cap is typically attached to the gear by inserting the flange in the groove of the gear. A snap ring is inserted into the channel to capture the flange between the snap ring and the floor of the groove and retain the cap to the gear in the axial direction. Additionally, the flange and the lip each define teeth that are complimentary to one another. Therefore, the teeth of the flange and the teeth of the lip mesh when the cap is inserted into the groove to prevent axial rotation of the cap relative to the gear.

SUMMARY OF THE INVENTION

An internal gear and cap assembly includes an internal gear having a base that extends about an axis between a first end and a second end. At least one tooth extends radially from the base. The first end defines a groove that extends to a floor and the groove extends about the axis. A cap has a central portion and a flange that extends about the periphery of the central portion. The flange is disposed in the groove. A lip extends from the first end and about the axis. The lip is deformed toward the groove such that the flange is trapped between the lip and the floor of the groove to retain the cap to the gear.

A method of manufacturing an internal gear and cap assembly includes providing an internal gear having a base that extends about an axis between a first end and a second end. The method also includes forming a groove that extends to a floor about the axis of the gear and forming a lip that extends from the first end about the axis of the gear. The method further includes providing a cap having a central portion and a flange that extends about the periphery of the central portion. The flange of the cap is inserted into the groove of the gear and the lip is deformed toward the groove to trap the flange of the cap between the lip and the floor of the groove to retain the cap to the gear.

Deforming the lip over the flange to retain the cap to the gear eliminates the need for a snap ring. The elimination of the snap ring results in reduced cost to manufacture the gear by eliminating the additional steps involved in forming the channel that receives the snap ring. In addition, elimination of the area on the lip for accommodating the snap ring allows the body of the gear to be shorter, which results in improved packaging of the gear. Deforming the lip also prevents axial movement of the gear relative to the flange, thereby eliminating a common failure mode that is caused by wear that exists between the flange and the gear in snap ring equipped designs.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike:

FIG. 3 is a cross-sectional side view of the gear and cap of FIG. 2 with the lip deformed over the flange to retain the cap to the gear;

FIG. 4 is a top perspective view of one embodiment of the cap having a periphery of the flange;

DESCRIPTION OF THE PREFERRED EMBODIMENTS

Figure 1:
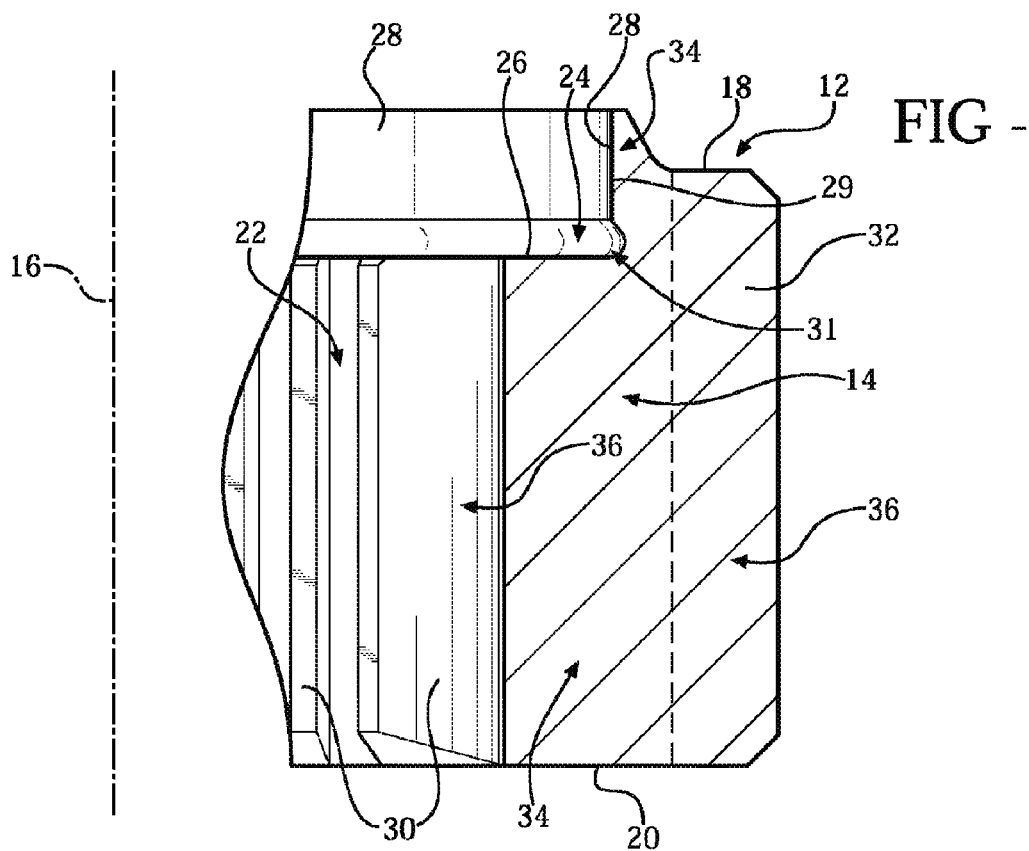
FIG. 1 is a cross-sectional side view of an internal gear defining a groove surrounded by a lip.

Referring to the drawings, wherein like reference numbers refer to like components, FIG. 3 shows an internal gear and cap assembly at 10. The assembly 10 includes a gear 12 and a cap 13. The assembly 10 is for use inside a transmission and the like.

Figure 2:
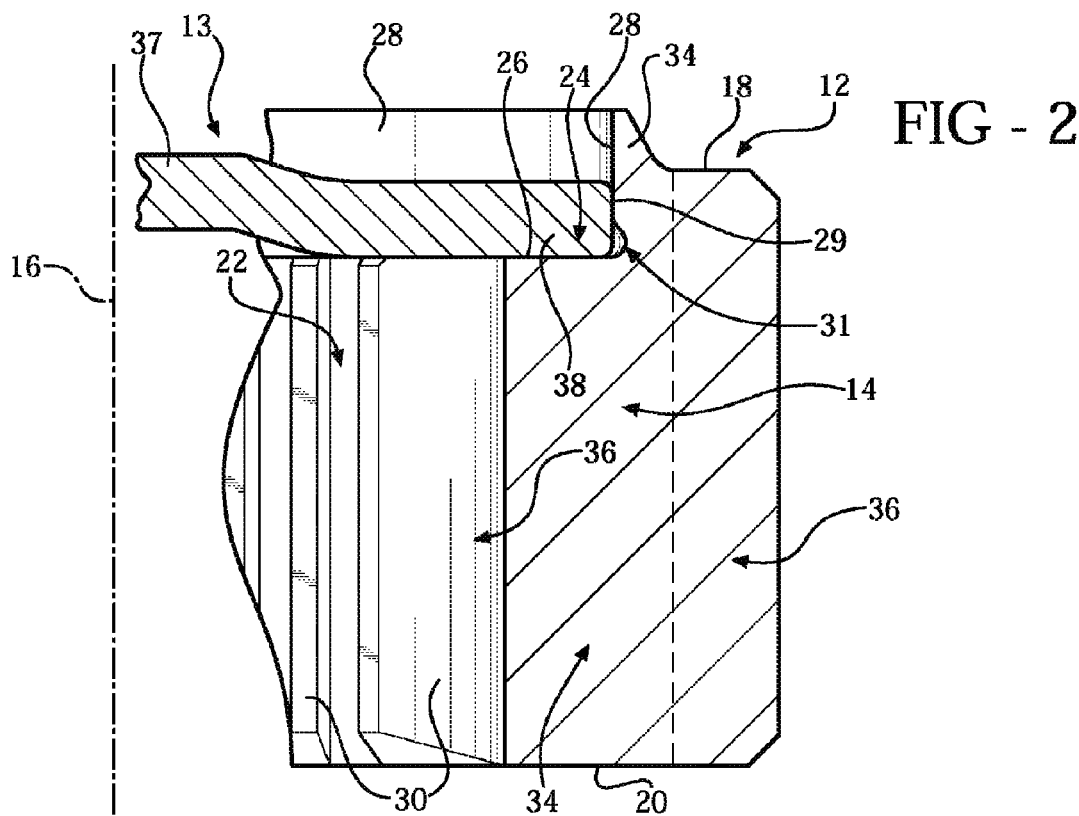
FIG. 2 is a cross-sectional side view of the gear of FIG. 1 with a flange of a cap inserted in the groove.

Referring to FIGS. 1-3, the gear 12 includes a base 14 that extends about an axis 16 of rotation between a first end 18 and a second end 20. The gear 12 may be formed from steel or any other material known to those skilled in the art. The base 14 defines a hollow interior 22 that extends between the ends 18, 20. Therefore, the base 14 is generally tubular. The first end 18 is in spaced and generally parallel relationship to the second end 20. The first end 18 defines a groove 24 that extends to a floor 26 and the groove 24 surrounds the axis 16. Referring specifically to FIGS. 1 and 2, a lip 28 is initially formed to extend from the first end 18 such that the lip 28 surrounds the axis 16 in spaced and generally parallel relationship. This means that the lip 28 initially extends from the floor 26 of the groove 24 to beyond the first end 18. The lip 28 is adjacent the groove 24, such that the lip 28 surrounds the groove 24. In one embodiment, the lip 28 surrounds the groove 24 as a single and continuous lip 28. It should be appreciated, that the invention is not limited to the lip 28 being continuous as the lip 28 may have other configurations, i.e., a lip 28 that is non-continuous, etc. that surround the groove 24, as known to those skilled in the art. In addition, the groove 24 is surrounded by a zone 29 that extends between the first end 18 and the floor 26 for centering the cap 13 relative to the axis 16 and the lip 28 extends from the zone 29. In another embodiment, the zone 29 defines a clearance channel 31 that is generally adjacent the floor 26. It should be appreciated however, that the groove 24 and lip 28 are not limited to being defined in the first end 18, as a second groove and lip may be defined in the second end 20.

The gear 12 includes at least one tooth 30, 32 that extends radially from the base 14, as shown generally in FIGS. 1-3. This means that the teeth 30, 32 may be teeth 30 that extend radially inward and/or the teeth 30, 32 may be teeth 32 that extend radially outward. A plurality of the teeth 30, 32 are radially spaced to extend from the base 14. Therefore, the teeth 30, 32 may be internal teeth 30 that extend radially inward, into the hollow interior 22 and toward the axis 16, and/or the teeth 30, 32 may be external teeth 32 that extend radially outward, away from the axis 16.

In one embodiment, the teeth 30, 32 on the gear 12 are hardened using an induction hardening process, or any other hardening process known to those skilled in the art. It should be appreciated that hardening is not limited to the teeth 30, 32 as other areas of the gear 12 may also be hardened as known to those skilled in the art. It should also be appreciated that it is not required that all of the teeth 30, 32 on the gear 12 be hardened. For example, in one embodiment, only the teeth 30 that extend radially inward are hardened while the teeth 32 that extend radially outward are not hardened. As another example, in another embodiment, only the teeth 32 that extend radially outward are hardened while the teeth 30 that extend radially inward are not hardened. However, it should be appreciated that the hardening of the teeth 30, 32 are not limited and other variations may be provided as known to those skilled in the art. Prior to hardening the teeth 30, 32, the entire gear 12 is at the same hardness. After hardening the teeth 30, 32, the gear 12 defines a first hardness region 34, having a first hardness, and a second hardness region 36, having a second hardness, as shown generally in FIGS. 1-3. In one embodiment, the first hardness region 34 includes all areas of the gear which were not hardened during the hardening process. In this embodiment, this means that the first hardness region 34 includes the lip 28 and the base 14. The second hardness region 36 may include one or more of the teeth 30, 32. The first hardness of the first hardness region 34 is less than the second hardness of the second hardness region 36. In one embodiment, the first hardness is a Rockwell C hardness (HRC) of less than 30. It should be appreciated that the first hardness is not limited to being a HRC of less than 30 as the first hardness may be up to a HRC of 40-45. It is preferred that the first hardness has a HRC of from 15-25. More preferably, the first hardness has a HRC of from 20-25. As will be explained in more detail below, to allow adequate deformation of the lip 28, it is important that the second hardness region 36 does not extend into the lip 28. After hardening the gear 12, the second hardness has a HRC of 30 or more, which is suitable for gear teeth 30, 32, while allowing the remaining portion of the gear 12, i.e., the first hardness region 34, to remain at the initial first hardness. However, the second hardness is typically approximately a HRC of 55 or more.

Figure 5:
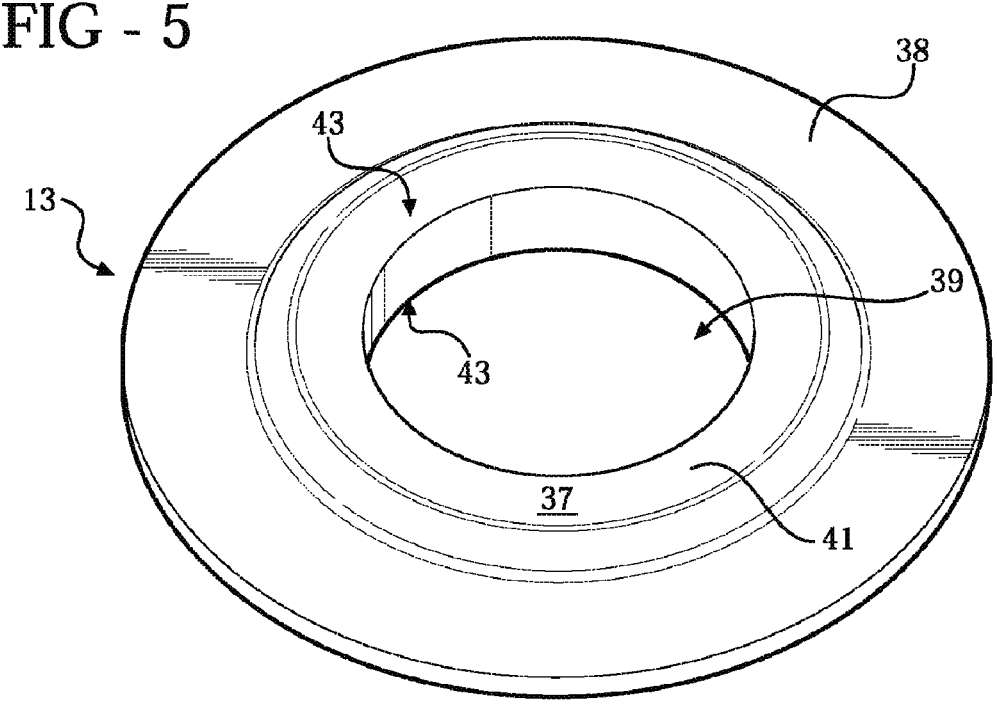
FIG. 5 is a top perspective view of another embodiment of the cap defining slots about the periphery of the flange.
Figure 6:
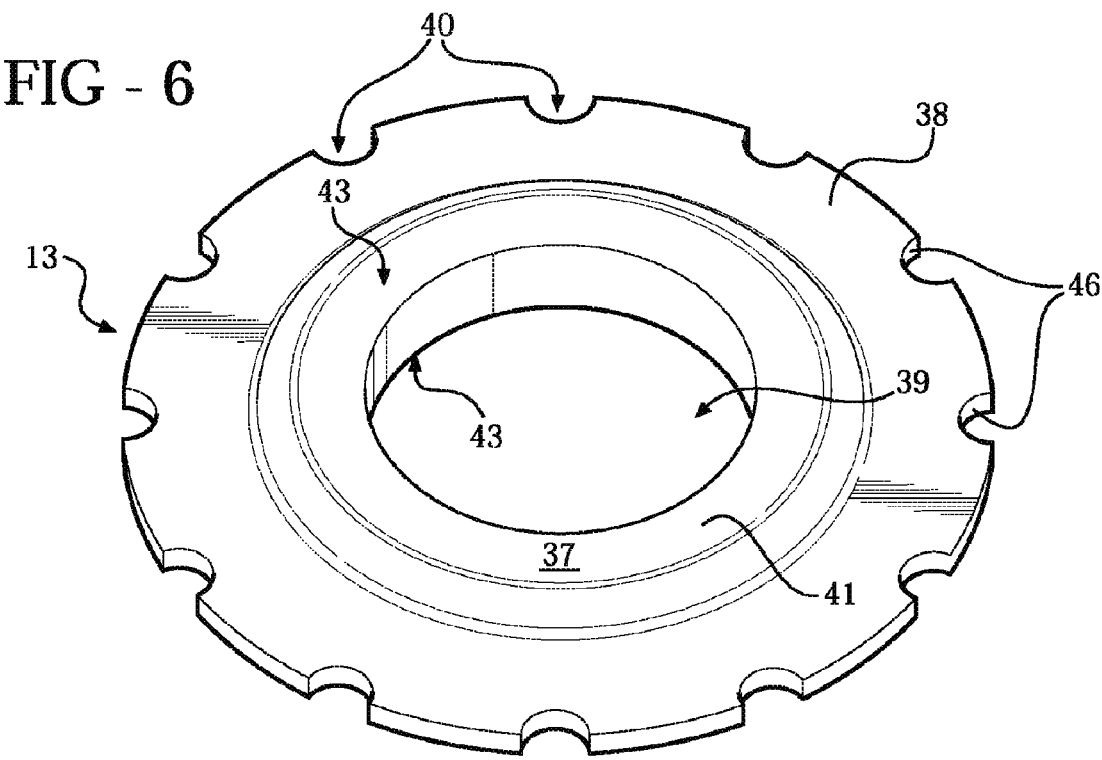
FIG. 6 is a top perspective view of yet another embodiment of the cap defining slots about the periphery of the flange.

Referring to FIGS. 4-6, the cap 13 is circular in shape and may be formed from stamped sheet metal, such as steel, aluminum, or any other material known to those skilled in the art. It should be appreciated, however, that the cap 13 is not limited being formed from stamped sheet metal, but may be formed from any process or material known to those skilled in the art. The cap 13 includes a central portion 37 and a flange 38 that extends about the periphery of the central portion 37. The central portion 37 may be formed in a domed-shape or as any other shape known to those skilled in the art. The cap 13 restrains the internal gears against axial thrust in both directions along the axis 16. In one embodiment, the central portion 37 defines a thru-hole 39. The thru-hole 39 allows rotating components (not shown) within the transmission (shown) pass through the cap 13. The thru-hole 39 is surrounded by a collar 41 that provides a pair of opposing thrust surfaces 43 for supporting an axial thrust bearing (not shown). The thrust surface 43 is typically an area that is maintained at a tighter tolerance than the other areas of the central portion 39. The thrust surfaces 43 provide a surface for mating against axial needle bearings, thrust washers, and the like (not shown). The cap 13 has the ability to withstand the axial forces without allowing the cap 13 to move radially or axially. In another embodiment, the cap 13 defines a splined input (not shown) within the thru-hole 39 to transmit torque through the cap 13 and into the gear 12.

The cap 13 is assembled to the gear 12 by disposing the flange 38 in the groove 24 of the gear 12, as shown in FIG. 2. As will be explained in more detail below, the lip 28 may be deformed under high pressure such that the deformed material of the lip 28 flows toward the groove 24 to trap the flange 38 between the lip 28 and the floor 26 of the groove 24, creating a closed-end gear 12, as shown in FIG. 3. As described above, to allow the material of the lip to be deformed, the lip 28, i.e., the first hardness region 34, should have a first hardness of less than a HRC of 45. Preferably, a first hardness of less than an HRC of 30 is used. However, it should be appreciated that other hardness' may also be used, as known to those skilled in the art, so long as the material of the lip 28 deforms to trap the flange 38 between the lip 28 and the floor 26 of the groove 24. Retaining the cap 13 to the gear 12 by trapping the flange 38 between the lip 28 and the floor 26 of the groove 24 retains the cap 13 to the gear 12 in the axial direction. In addition, when the lip 28 is deformed toward the groove 24, the zone 29 remains generally undeformed. By preventing the zone 29 from deforming when the lip 28 is deformed, the cap 29 remains generally centered relative to the axis 16.

The lip 28 may be deformed by a deformation process such as orbital forming, roll forming, and the like. Orbital forming typically uses a punch at a slight angle, i.e., 3-7 degrees, that is pushed against the gear 12 while turning or orbiting around the gear 12 as the punch is forced toward the lip 28 of the gear 12. The punch is typically forced into the lip 28 of the gear at a force which is sufficient to plastically deform the lip 28. Similarly, roll forming uses a roller that rolls against the lip of the gear 12 at a force of 2000 pounds or more. However, due to the large force that is introduced into the gear 12, the gear 12 needs to be supported directly opposite the lip 28, i.e., in line with the lip, on the second side 20 of the gear 12. The support for the gear 12 prevents radial distortion of the gear 12, especially of the zone 29 which keeps the cap 13 centered relative to the axis 16.

The flange 38 may define one or more slots 40, as shown in FIGS. 5 and 6. The slots 40 are spaced radially about the flange 38. When the lip 28 is deformed during the deformation process, a portion of the lip 28 flows into the slot 40 to create a key-lock 42 between the cap 13 and the gear 12, as shown in FIG. 3. The key-lock 42 provides additional radial torque capacity between the cap 13 and the gear 12 to prevent rotation of the cap 13 relative to the gear 12 about the axis 16. Even without the slots 40, the deformed lip 28 that traps the flange 38 between the lip 28 and the floor 38 provides significant axial thrust and radial torque capacity. Therefore, deforming the lip 28 both over the flange 38 and into the slots 40 of the flange 38 retains the cap 13 to the gear 12 in the axial and radial directions. In one embodiment, the slots 40 extend into the flange 38 to a bottom 44, as shown in FIG. 4. In this embodiment, when the lip 28 is deformed into the slots 40, the bottom 44 of the slot 40 is sandwiched or trapped between the lip 28 and the floor 26 of the groove 24 to create the key-lock 42 to prevent rotation of the cap 13 relative to the gear 12 about the axis 16. In another embodiment, the slots 40 extend all the way through the flange 38, as shown in FIG. 5. In this embodiment, each slot 40 is defined by side walls 46 such that when the lip 28 is deformed into the slot 40, the lip 28 flows between the side walls 46 to create the key-lock 42 to prevent rotation of the cap 13 relative to the gear 12 about the axis 16. The slots 40 may be formed by stamping, roll forming, a die depression, and the like.

Figure 7:
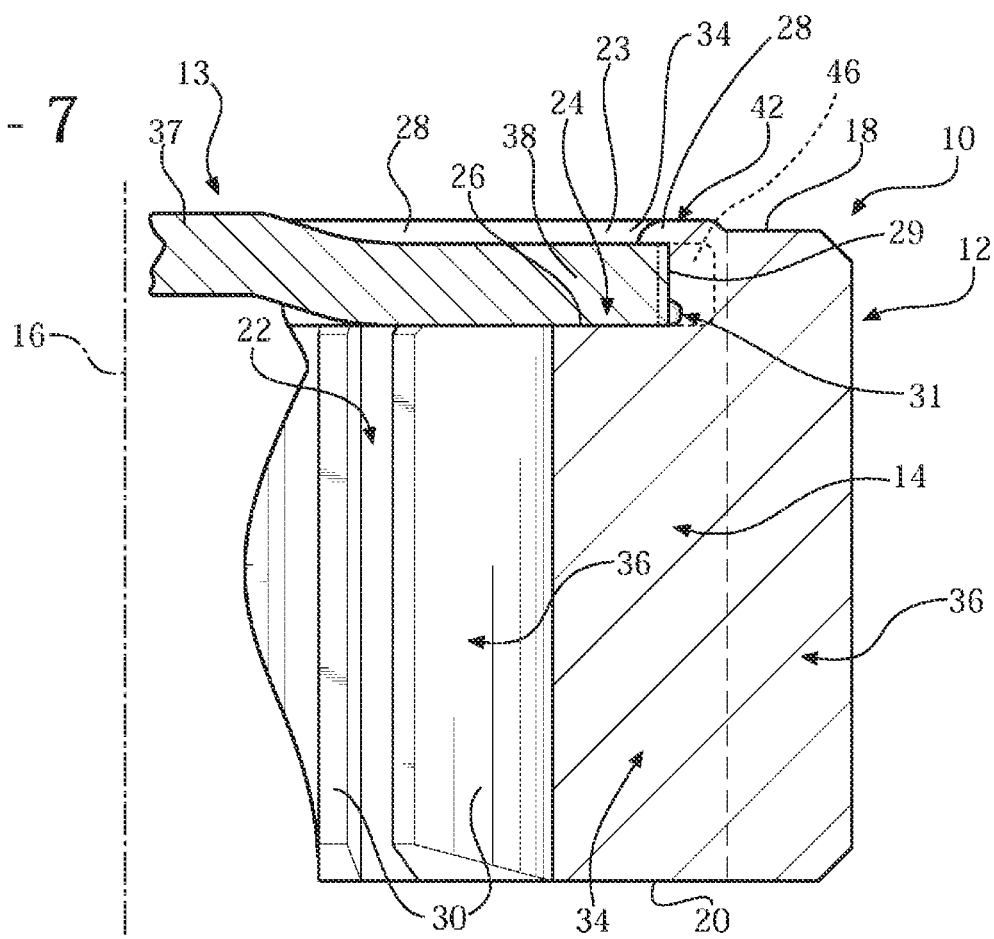
FIG. 7 is a cross-sectional side view of an alternative embodiment of the gear of FIG. 1 with slots of the flange engaging partial-height teeth within the groove and the lip is deformed over the flange to retain the cap to the gear.

In another embodiment, shown in FIG. 7, the gear 12 includes a plurality of partial-height teeth 46 within the groove 24. The partial-height teeth 46 extend radially inward from the zone 29. The partial-height teeth 46 mesh with the slots 40 or splines defined in the flange 38 of the cap 13 to provide radial engagement between the cap 13 and the gear 12. The radial engagement locks the cap 13 relative to the gear 12 and prevents rotation of the cap 13 relative to the gear 12 about the axis 16. In addition, when the lip 28 is deformed into the slot 40, the lip 28 flows over the flange 38 to further retain the cap 13 relative to the gear 12 and to prevent axial displacement of the cap 13.

While the best modes for carrying out the invention have been described in detail, those familiar with the art to which this invention relates will recognize various alternative designs and embodiments for practicing the invention within the scope of the appended claims.

The invention claimed is:

1. A method of manufacturing an internal gear and cap assembly, said method comprising:
providing an internal gear having a base extending about an axis between a first end and a second end;
forming a groove extending to a floor about the axis of the gear;
forming a lip extending from the first end about the axis of the gear such that the lip radially surrounds the groove;
providing a cap having central portion and a flange extending about the periphery of the central portion;
inserting the flange of the cap into the groove of the gear;
deforming the lip toward the groove to trap the flange of the cap between the lip and the floor of the groove and retain the cap to the gear such that the lip extends toward the axis of the gear;
forming at least one slot in the flange of the cap; and
deforming the lip into the at least one slot to form a key-lock between the flange and the lip to prevent the cap from rotating relative to the gear, about the axis.

2. A method of manufacturing an assembly, as set forth in claim 1, wherein deforming the lip is further defined as roll forming the lip toward the groove to trap the flange of the cap between the lip and the floor of the groove to retain the cap to the gear.

3. A method of manufacturing an assembly, as set forth in claim 1, wherein deforming the lip is further defined as orbital forming the lip toward the groove to trap the flange of the cap between the lip and the floor of the groove to retain the cap to the gear.

4. A method of manufacturing an assembly, as set forth in claim 1, wherein providing a gear further includes providing at least one tooth extending radially from the base.

5. A method of manufacturing an assembly, as set forth in claim 4 further comprising hardening the at least one tooth to a Rockwell C hardness that is greater than a Rockwell C hardness of the lip.

* * * * *